United States Patent [19]

Jacobs et al.

[11] 3,920,590

[45] Nov. 18, 1975

[54] LOW-DENSITY POLYESTER RESIN FOAMS AND METHOD OF PREPARATION

[75] Inventors: Richard L. Jacobs, Yorba Linda; Donald A. Backley, Garden Grove; James V. Simpson, Anaheim, all of Calif.; Walter Beck, Bedford, Mass.

[73] Assignee: Stepan Chemical Company, Northfield, Ill.

[22] Filed: July 18, 1974

[21] Appl. No.: 489,824

[52] U.S. Cl. ........ 260/2.5 N; 260/2.5 B; 260/22 CB; 260/22 XA; 260/22 CA; 260/23 P; 260/863; 260/864; 260/865; 260/866; 260/869
[51] Int. Cl.² ...................... C08J 9/00; C08L 67/06
[58] Field of Search ...................... 260/2.5 N, 2.5 B

[56] References Cited
UNITED STATES PATENTS

| | | |
|---|---|---|
| 3,227,665 | 1/1966 | Fourcade et al. ............... 260/2.5 N |
| 3,232,893 | 2/1966 | Salgado et al. ................. 260/2.5 N |
| 3,260,688 | 7/1966 | Watanabe et al. ............... 260/2.5 N |
| 3,786,004 | 1/1974 | Furuya et al. .................. 260/2.5 N |

*Primary Examiner*—Richard B. Turer
*Attorney, Agent, or Firm*—Richard P. Crowley

[57] ABSTRACT

Low-density polyester foams are prepared from an admixture which comprises in combination a liquid unsaturated curable polyester resin, a peroxide-curing agent, a cobalt promoter and a hydrazide blowing agent, the peroxide-curing agent and cobalt promoter both present in high concentration levels.

22 Claims, No Drawings

3,920,590

LOW-DENSITY POLYESTER RESIN FOAMS AND METHOD OF PREPARATION

BACKGROUND OF THE INVENTION

Polyester foams have, in the past, been prepared by a number of techniques; however, the methods employed and the foams produced have not been wholly satisfactory or commercially successful. Various agents and methods have been used in order to extend or expand unsaturated polyester resin (for example, see U.S. Pat. Nos. 3,470,114 and 3,673,132 and French Patent 2,062,608).

Polyester foams have been prepared by mechanical frothing techniques and by the use of chemical blowing agents. The use of hydrazide, hydrazo, azo and diazo-based chemical blowing agents which thermally decompose at high temperatures to provide expanded elastomers and thermoplastic polymers is well known (for example, see U.S. Pat. No. 3,461,087). The use of chemical blowing agents to date has been unsuccessful in expanding liquid polyester resins to low-density foams. Often the decomposition temperature of the blowing agent is either too high or too low to obtain a proper foam product.

In some compositions, the blowing agent does not function in the presence of the particular curing system used in polymerizing the resin. For example, hydrazide blowing agents are stable and nonreactive, or react very slowly, with some peroxides at room temperature of 80°F, and at slightly above room temperatures even in high concentrations. The addition of such chemical blowing agents to liquid unsaturated polyester resins does not cause the proper expansion of the polyester resins at room temperature upon catalysis by the peroxide alone. Further, admixtures of such blowing agents, peroxides and polyester resins do not cause expansion of the polyester resins, except upon the application of external heat. The external heat process is most difficult to control, and only a slight degree of expansion is obtained even under such conditions. Typically, the high-density foam produced exhibits severe cracking resulting from the delayed expansion of the foam resin after polymerization of the liquid resin.

A commercially available blowing agent known as OBSH-((4,4'oxybis(benezenesulfonyl hydrazide)) has been employed in peroxide catalyzed liquid unsaturated polyester resins to produce high-density polyester foams; however, such foams have not been satisfactory. OBSH normally has a decomposition temperature in air of about 150°C and in plastics of about 130° to 140°C. Commercially, OBSH is used as a blowing agent in thermoplastics, such as vinyl-chloride resins and olefinic-type resins. HOwever, when employed in typical liquid polyester resins, a foam density of not less than about 50 pounds per cubic foot (pcf) is usually obtained which represents only a 10 to 30% expansion. The foam so obtained is often characterized by severe surface-cracking, splitting, non-uniform cells or other defects, since polymerization substantially occurs well prior to full decomposition of the OBSH blowing agent.

The decomposition temperature of OBSH have been lowered by the action of certain peroxides in particular saturated polysulfide rubbers employing OBSH; e.g., with a lead peroxide at room temperature (see, for example, U.S. Pat. Nos. 3,095,387 and 3,114,723). However, the rate of decomposition in such systems is very slow, with several hours at least required for completion of the decomposition, making such technique commercially impractical.

Some of the chemical blowing agents previously referred to become reactive with certain peroxides at low temperatures when in the presence of other chemicals known as promoters and accelerators. Admixtures of these chemicals in a liquid unsaturated polyester resin cause expansion of the polyester to provide a polyester foam. However, the foam produced is unsatisfactory and is not of low density. The expansion in such systems only partially occurs before polymerization. Since expansion continues to occur after polymerization of the liquid resin by the residual previously unreactive blowing agents, continued expansion results in diminished efficiency of the blowing agent, unacceptable cracking within the polyester foam produced and foams of high density.

In summary, although polyester foams have been produced, these foams and the techniques employed in preparing these foams have not proven commercially successful or wholly practical. A method of producing polyester foams of low density, for example, less than about 40 pounds, such as 30 pounds per cubic foot (pcf), would be most desirable. Such method and the foams produced provide a significant economic advantage in the value of the material saved by the weight reduction. In addition, the availability of acceptable low-density polyester foams permits many new applications for polyester resins, such as its use as a rigid foam structural material, and in thermal, electrical and accoustical installations, for buoyancy and in many other fields.

SUMMARY OF THE INVENTION

Our invention concerns low-density polyester resin foams, liquid polyester resin foamable compositions from which such foams are prepared, and the method of preparing such compositions and such foams.

In particular, the liquid foamable polyester resin composition from which our polyester foams are prepared comprises: a liquid unsaturated polyester resin subject to cure; e.g., either to a flexible, semirigid or rigid resin; a peroxide-curing agent which is capable of forming free radicals; a cobalt accelerator or promoter; and a blowing agent which hydrolyzes to provide a hydrazine radical or ion and which liberates the gas to provide for the expansion of the liquid polyester resin, both the cobalt promoter and peroxide-curing agent present in high concentration levels, which permits expansion of the composition to be carried out in a selective manner prior to the curing of the resin, thereby providing for the production of a low-density polyester foam from the liquid foamable composition.

In our liquid foamable composition, each of the foregoing components must be present in combination, and the peroxide and cobalt both at high levels, in order to provide that the rate of polymerization of the polyester resin and the rate of decomposition of the blowing agent are selectively and properly matched. In such a composition, the liquid resin composition contains sufficient strength in the early gel stages or phases to retain the gas generated by the blowing agent. In the later stages of such composition, the rate of cure does not progress so rapidly, so as to provide a high-density mass where internal or surface cracking occurs through preliminary polymerization of the polyester resin prior to the complete or substantially complete decomposition of the blowing agent. Our invention provides a composition for and a method of so adjusting the rate of decomposition and the rate of cure to provide for a new and unique polyester foam characterized by a very low density, usually less than 30 pcf, e.g., 20 pcf, and good foam characteristics. Our foams have a lack of or a substantial reduction in internal stresses and surface cracking, and exhibit uniform cellular structure. Our method permits polyester foams often having a density as low as 10 pcf or lower to be prepared; for example, rigid and semirigid foams of from about 8 to 30 pcf.

Furthermore, our invention permits the preparation of two-component liquid systems whose components are blends which are stable for periods exceeding three months. These two-component systems are mixed in ratios varying from 1:1 to 50:1 by weight, depending upon the application properties and final physical properties desired. These components are immediately reactive even after standing for three months at temperatures no greater than 85°F to fine foams which have essentially the same properties as those blends immediately prepared. The blends of the liquid polyester resin, the blowing agents, the accelerator or promoter and other compounds are stable, provided that the peroxide catalyst is retained in the second component. The peroxide component is prepared in a blend of hydroxyl-bearing resins and is stable indefinitely even in the presence of certain of these compounds.

The liquid unsaturated polyester resins in our composition comprise a linear or only slightly branched polyester resin and a peroxide cross-linkable monomeric compound. The linear or slightly branched polyester resin is typically prepared as a condensation or reaction product of an unsaturated polybasic and a polyhydric compound; for example, the condensation product of an unsaturated dibasic acid of alpha-beta ethylenic unsaturation and a di or trihydric compound, such as a glycol. Often a saturated polybasic acid or anhydride, such as a dibasic acid, is employed with the unsaturated acid or anhydride to modify the reactivity of the unsaturated resin.

Examples of typical polyhydric alcohols include, but are not limited to: ethylene glycol; 1,2-propane diol; 1,3-propane diol; diethylene glycol; dipropylene glycol; triethylene glycol; tripropylene glycol; 1,2-butane diol; 1,3-butane diol; 1,4-butane diol; neopentyl glycol; 2,2,5-trimethylpentane diol; cyclohexanedimethylol; dibromoneopentyl glycol; dibromobutane diol; trimethylolpropane; pentaerythritol; trimethylpentane diol; dipropoxy adducts of bis phenol A; and dipropoxy adducts of hydrogenated bis phenol A.

Examples of saturated polybasic acids include, but are not limited to: isophthalic acid; orthophthalic acid; terephthalic acid; tetrabromophthalic acid; tetrachlorophthalic acid; tetrahydrophthalic acid; adipic acid; succinic acid; azelaic acid; glutaric acid; nadic acid and the various anhydrides obtained therefrom.

Examples of unsaturated polybasic acids include, but are not limited to: maleic acid; fumaric acid; itaconic acid; citraconic acid and anhydrides obtained therefrom.

Examples of peroxide curable cross-linking monomers employed with the linear polyesters include, but are not limited to: styrene; vinyl toluene; acrylates and methacrylates like methylmethacrylate; alphamethyl styrene; chloro styrene; and diallyl phthalate. The liquid unsaturated polyester resins also typically contain small amounts of inhibitors in order to prevent premature reaction, such as, for example: hydroquinone; quinone and tertiary butyl catechol. These monomers, the saturated acids, the unsaturated acids and the polyhydric compounds may be admixed together in various proportions as is known in the art in order to obtain resins with varying properties, typically in amounts of about 0 to 50% by weight; for example, such as 5 to 45%. Such liquid resin compositions may include a wide variety of other additives to include: viscosity index improvers; rheological agents; flame retardants; thermoplastic polymers; fillers such as hollow glass or plastic microsphere beads; wood flour; silica; diatomaceous earth; pigments; dyes; stabilizers; glass fibers; release agents; extenders; catalysts; alumina surfactants; and other additives (see, for example, compounds in "Unsaturated Polyester", Modern Plastics Encyclopedia, Volume 50, No. 10a, 1973–1974,, pp. 66–68, hereby incorporated by reference).

The various components of the polyester resins may be varied as is known in the art to impart the desired properties to the cured resin. Typically, flexible resins employ greater amounts of adipates or azeleates, while more rigid resins use phthalates, both with a variety of different glycols. Our invention is directed particularly to rigid and semirigid polyester foams useful as structural-type foams. Such resins have a formulation, for example, of about 3 to 5 moles of glycol, 1.5 to 3.0 moles of adipic acid, and 0 to 1.5 moles of phthalic anhydride, with from 1.0 to 2.5 moles of styrene or vinyl toluene.

However, particular emphasis is placed on formulating the resin to contain high amounts of linear dibasic glycols and linear dibasic acids; e.g., over 70%, while maintaining a low amount of aromatic dihydric acids and anhydrides, unsaturated acids, and monomers in order to impart to the resin a substantial degree of elasticity not found in typical polyester resins. Formulating for these properties becomes limited by the desired rigidity and heat resistance properties of the finished foam product. Polyester resins modified to have this elasticity and containing atypically high levels of metal; e.g., cobalt accelerators aor promoters, allow expansion to proceed in a more unrestricted fashion than for highly cross-linked and more rigid polymers. Foams having densities ranging from 30 to 40 pcf, but sometimes lower than 30 pcf, are obtained characterized by having substantial cracking and splitting because polymerization substantially occurs prior to full decomposition of the blowing agent.

The liquid unsaturated polyester resins of our composition are employed in conjunction with a free-radical curing compound or a compound capable of forming a free radical. The crosslinked initiating compound is typically a peroxide, and would include peroxides capable of forming a free radical ($RO\cdot$ and $R'O\cdot^2$), particularly alkoxy-free radicals. Such peroxides are characterized by their reaction with metal salts or metal soaps which are a general class of agents known as accelerators or promoters and redox agents.

Examples of peroxides include, but are not limited to: all peroxides known as hydrogen peroxide; all hydroperoxides including saturated aliphatic hydroperoxides; olefinic hydroperoxides; aralkyl hydroperoxides; hydroperoxides of cycloaliphatic and heterocyclic organic molecules; dialkyl peroxides; transanular peroxides; peroxyesters; peroxy derivatives of aldehydes and ketones; hydroxyalkyl hydroperoxides; bis(hydroxyalkyl) peroxides; polyalkylidene peroxides; peroxy acetals, etc. The R radical of the peroxide must be an a substituent usually characterized as alkyl, and must be saturated alkyl, olefinic alkyl, vinyl, allyl, benzyl, propenyl, isopropenyl, butenyl, etc., saturated or partially unsaturated aliphatic or cycloaliphatic. R' can be the same as R or it can be a hydrogen, aryl, acyl, or aroyl substituent. Examples include: methyl hydroperoxide; ethyl hydroperoxide; t-butyl hydroperoxide; dimeric benzaldehyde peroxide; dimeric benzophenone peroxide; dimeric acetone peroxide; methylethyl ketone hydroperoxide, etc.

The preferred peroxides are hydrogen peroxide or alkoxy peroxides which actuate at low temperatures less than 100°F; e.g., 65° to 90°E, with an aqueous solution of hydrogen peroxide and methylethyl ketone peroxide being the most effective peroxides. Other peroxides, such as hydroperoxides such as cumene hydroperoxide, although useful, are less effective, while peresters, such as tertiarybutylperbenzoate and tertiarybutylperoctoate, are less effective. Peracids, such as benzoylperoxide, are slightly less effective, while azobisisobutyronitrile, a free-radical generator upon thermolysis, is not effective. The peroxide cross-linking catalyst is required in all of the liquid saturated polyester resins in order to promote the cure of the resins. The peroxide compounds may be used alone or in combination.

The promoters or activators used in polyester resins include a wide range of metallic salts; e.g., organo-metallic salts, and particularly metal salts and soaps which have a beneficial effect in activating or promoting the reaction, and which are known and used in the trade as accelerators or promoters. Such activators are composed of metal salts and metal soaps typically in their reduced polyvalent states. The compounds are characterized by their preferential reaction with peroxide, and their partial reaction with the free radicals generated from the initial reaction with the peroxide. Typical activators include all oil-soluble salts; e.g., metal soaps and salts and complexes thereof generated by the reaction in polyester resin systems. Such activators would include salts, soaps and complexes of cobaltous, ferrous, vanadous, cadmium, manganous, cuprous, nickelous, stannous, plumbous, zirconium, chromous ions, etc. The anions of such activators may vary and are often selected to impart solubility to the activators in the polyester system. Typical anions are carboxylates such as $C_2-C_{18}$ carboxylates, and include shortchain acids, fatty acids and naphthenates. Such anions include acetate, propionate, butyrate, 2-ethylhexoate, hexoate, octoate, laurate, oleate, linoleate, palmitate, stearate, acetoacetonates, and naphthenates. The preferred activators are the cobalt compounds such as cobalt octoate, cobalt acetoacetonates and cobalt naphthenate. The activators may be used alone or in combination with other activators or metal salts.

The chemical blowing agents employed in our compositions include hydrazide-derived and hydrazine-type blowing agents which are capable of providing on decomposition a gas, typically nitrogen, alone or in combination with other gases, to provide for the expansion of the polyester resin matrix. The chemical blowing agents useful in our compositions must be those blowing agents which are capable of being easily reacted with an ion or radical ($RO^-$, $RO^+$ or $RO\cdot$) to liberate an active moiety which will further decompose to liberate the gas.

The hydrazides and particularly the sulfonyl hydrazides are the preferred class of blowing agents to be used in our compositions. Examples of blowing agents include, but are not limited to: hydrazine, adipodihydrazide; hydroxyethylhydrazine; phenylsulfonhydrazide; 4,4'-oxybis(benzenesulfonhydrazide); hydrazine sulfate; hydrazinemonochloride; hdyrazinedichloride; hydrazine bisulfate; benzene -1,3-disulfonylhydrazide; toluene-(4)-sulfonylhydrazide; diphenylsulfon-3,3'-disulfonylhydrazide, and similar hydrazide and hydrazine salts and derivatives. Preferred specific compounds, due to their readily commercial availability and action in our compositions, include: oxybis(benzenesulfonylhydrazide) and toluene sulfonyl hydrazide. The blowing agents are typically employed in varying amounts; however, they may be employed in amounts ranging from about 0.1 to 15 phr, such as, for example, 0.3 to 10 phr. The blowing agents may be used alone or in combination.

Our compositions expand foams to densities substantially below 30 pcf while giving finished product foams which have essentially fine uniform cellular structure and are characterized by being free from voids, splits, cracks and other defects. The addition of the cobalt and peroxide at the described levels to polyester systems permits polyester foams to be prepared having densities as low as 30 pcf or lower.

Although not wishing to be bound by any particular theory or hypothesis, we believe that these low-density foams characterized by uniform cellularity are produced because the compounds at such levels specifically cause expansion to precede selectively polymerization and, specifically, gelation. Gelation is not retarded or inhibited in a fashion typical of systems containing inhibitors. Some agents increase the rate of gelation, but still cause expansion to precede polymerization. Other agents do cause the gelation period to become extended.

We have discovered that low-density polyester foams may be prepared from liquid foamable polyester resin compositions when both a cobalt-metal promoter and a free radical-generating catalyst compound are employed at concentration levels considerably above the concentration levels at which such compounds are typically employed in the nonfoamable liquid polyester resins composition. Increasing the level of either the cobalt or the catalyst alone, while effecting some reduction in foam density, is not wholly satisfactory. High concentrations of both compounds unexpectedly provide high-quality, low-density polyester foams. Reduction in foam densities to below 50 pcf is achieved when both the cobalt promoter and the catalyst are increased; for example, five or more times the usual concentration levels, and foam densities below 30 pcf when the cobalt promoter is increased to twenty or more times its usual level.

Typically, organo-metallic promoters for polyester resin, such as cobalt salts, are used and effective at very low concentrations. Excessive concentration levels are not used, since the cobalt promoters are expensive, and excessive amounts increase the residual metal concentration in the solid polyester resin, and such amounts provide little, if any, corresponding increases in promoter activity.

Typical concentration levels of an organo-cobalt promoter, like cobalt octoate (12% cobalt) in a polyester resin, range from about 0.01 to 0.1 parts per hundred parts of resin (phr), and in unusual situations, may go as high as 0.20 phr where very fast gel times are required; e.g., such as in spray resin systems.

Similarly, peroxide catalysts like methylethylketone peroxide are also used in small amounts but greater concentation and level excessive amounts are not used, if not required. Polyester peroxide agents like methylethylketone peroxide are typically used at concentration ranges of from about 0.5 to about 2.5 phr.

We have found that cobalt-salt promoters and peroxide catalysts in combination at concentration levels of from 5 to 30 times; e.g., 5 to 20 times, the usual level for the cobalt and at concentration levels of 2 to 10 times; e.g., 2 to 6 times, the usual levels for the peroxide are effective in providing low-density polyester foams in the presence of hydrazide blowing agents, and particularly sulfonyl hydrazide blowing agents. In our compositions, the cobalt promoter may be used at concentration ranges of 0.5 to about 5.0 phr, and preferably 1.0 to 2.5 phr, and the peroxide catalyst at ranges of about 3.0 to 10.0 phr, and preferably 4.0 to 6.0 phr. The ratio of the cobalt promoter and the peroxide catalyst may vary as desired. However, there is a stoichiometric relationship between the amount of the peroxide to be employed and the amount of the blowing agent, while the cobalt promoter level is based on catalysis or promotion activity and is independent of the relationship of catalyst and blowing agent.

Combinations of oil-soluble organo-cobalt salts, such as cobalt naphthenate, cobalt acetylacetate and cobalt $C_6$–$C_{18}$ fatty acid salts; e.g., octoate; e.g., at about 2 phr with methylethyl ketone peroxide and aqueous (30%) hydrogen peroxide; e.g., at about 5 phr for rigid and semirigid polyester formulations, produce good-quality, low-density foams of less than 50 pcf. Any cobalt-polyester promoter may be employed, such as those cobalt salts having inorganic and organic anionic radicals described as used with polyester metallic promoters. The cobalt promoter may be used alone or in combination at the usual levels, or at the high ranges as for the cobalt with other metallic salt promoters, such as tin, lead, calcium, manganese, rare earth metals, chromium, sodium, etc.; e.g., stannous octoate, lead naphthenate, rare earth naphthenates, sodium methoxide and chromium acetylacetonate.

The composition after preparation may be injected into a mold for the preparation of a foamed molded product. If desired, the composition, prior to use or injection, may be aerated by the mechanical whipping in of air or another inert gas. The optimum temperatures for the composition are 65° to 90°F, while the part can be cured at room temperature or cured at elevated temperatures. Typical elevated cure schedules include 1 hour at 200°F and 1 hour at 300°F. The gel times of our compositions range from as low as one second, but typically 0.1 to 5 minutes.

Our invention will be described for the purposes of illustration only with the use of semirigid and rigid polyester resin compositions to prepare low-density rigid foams.

SPECIFIC EMBODIMENTS

Resin A

A liquid unsaturated polyester resin was prepared as follows:

Formula:

| Components | Weight, grams |
|---|---|
| Step I | |
| Ethylene glycol | 464.4 |
| Propylene glycol | 570.8 |
| Phthalic anhydride | 1315.6 |
| Maleic anhydride | 529.2 |
| Triphenyl phosphite | 2.8 |
| Step II | |
| Styrene | 1121.2 |
| Hydroquinone | 0.6 |
| Copper (6%) naphthenate | 0.12 |
| Total charge | 4004.72 |
| Theoretical water loss | (256.4) |

Method of Preparation

The ingredients of Step I were weighed into a 5000 cc flask and fitted with a packed column, nitrogen feed, stirrer and a thermometer. A side arm connector was attached to the packed column and a condenser was attached to the side arm connector. The mixture was gradually heated to 210°C to remove water until an acid number of 30 was reached. The mixture was then cooled back to 125°C. Step II ingredients were added and thoroughly blended into the batch and cooled back to room temperature.

Resin B

Another liquid unsaturated polyester resin was prepared as follows:

Formula:

| Components | Weight, grams |
|---|---|
| Step I | |
| Adipic acid | 3736. |
| Dipropylene glycol | 10810. |
| Theoretical water loss | (760) |
| Step II | |
| Maleic anhydride | 5020. |
| Phosphoric acid (85%) | 10.0 |
| Theoretical water loss (total) | (1564) |
| Step III | |
| Vinyl toluene | 3570. |
| Hydroquinone | 0.9 |
| Copper (6%) naphthenate | 0.54 |
| Total resin | 20823.44 |

Method of Preparation

The Step I ingredients were weighed into a 22-liter flask fitted with a packed column, nitrogen feed, stirrer and thermometer. A side arm connector was attached to the packed column and a condenser was attached to the side arm connector. The mixture was heated gradually to 210°C to remove water until an acid number of 20 was reached. The mixture was then cooled back to 70°C and the Step II ingredients were added. The heat was then increased to 210°C until an acid number of 30 was reached. The heat was cut and the temperature reduced to 125°C. Step III ingredients were added and blended thoroughly and the batch was cooled back to room temperature.

EXAMPLE 1

Preparation of Control Formula I

Formula

| Components | Weight, grams |
|---|---|
| Resin A | 37.5 |

-continued

| Resin B | 12.5 |
|---|---|
| Base Resin | 50.0 |
| OBSH | 2.0 |
| Total | 52.0 |

Procedure

Resin A, Resin B and OBSH were blended in the above proportions and herein referred to as Control Formula I.

Method of Preparation of Promoted Resin Formulas 52.0 grams of Control Formula I were weighed into an 8 oz. paper cup. Cobalt (12%) octoate promoter was blended into the 52.0 grams of Control Formula I at the rate described in Table I below. The temperature of each blend was brought to 77±°F.

Method of Preparation of Foams

Each system was catalyzed by adding Lupersol DDM at the rate indicated in Table I. Each was high-shear mixed for 10 seconds using a 2-inch dimeter propeller blade driven by a ⅛ hp compressed-air motor operating at 50 psi pressure and rotating at about 3600 rpm. The bottom and sides of each cup were then scraped with a spatula, time permitting, to insure complete mixing. Each sample was allowed to rise and gel in the cup and the gel time was recorded. After exotherm, the samples were post-cured for one hour at 300°F and the density was determined by the water-displacement method after the samples had cooled down to room temperature.

Table I shows the general decrease in the foam density associated with increasing levels of promoter and catalyst.

TABLE I

| Number | Cobalt (12%) octoate weight added to the control formula grams | Lupersol[1] DDM weight added to the Control Formula, grams | Gel time, minutes | Foam Density, pcf |
|---|---|---|---|---|
| 1 | — | 0.5 | 25 | 70.1 |
| 2 | 0.10 | 0.5 | 3.0 | 66.8 |
| 3 | 0.20 | 0.5 | 1.6 | 62.4 |
| 4 | 0.50 | 0.5 | 0.8 | 61.2 |
| 5 | 1.00 | 0.5 | 0.6 | 54.0 |
| 6 | — | 1.25 | 18 | 69.2 |
| 7 | 0.10 | 1.25 | 1.0 | 64.7 |
| 8 | 0.20 | 1.25 | 1.2 | 60.9 |
| 9 | 0.50 | 1.25 | 0.9 | 61.1 |
| 10 | 1.00 | 1.25 | 0.6 | 50.0 |
| 11 | — | 2.50 | 15 | 70.5 |
| 12 | 0.10 | 2.50 | 2.8 | 57.8 |
| 13 | 0.20 | 2.50 | 1.5 | 51.0 |
| 14 | 0.25 | 2.50 | 1.2 | 46.6 |
| 15 | 0.50 | 2.50 | 0.9 | 35.9 |
| 16 | 0.75 | 2.50 | 0.8 | 30.1 |
| 17 | 1.00 | 2.50 | 0.7 | 28.9 |
| 18 | 1.25 | 2.50 | 0.6 | 30.0 |
| 19 | 1.50 | 2.50 | 0.6 | 28.5 |

[1]Lupersol DDM is a trademark of Pennwalt Corporation for 60% methylethyl ketone peroxide (q.v.)

Number 2 employing low levels of the cobalt promoter and peroxide catalyst in a typical liquid polyester resin formulation with OBSH as a blowing agent gave a foam density of 66.8 pcf, which is little, if any, expansion. The additon of OBSH in such formulation in high concentration levels to a typical polyester resin produced virtually no expansion of the resin.

EXAMPLE 2

The procedure of Example 1 was repeated using another cobalt promoter and methylethyl ketone peroxide catalyst. Table II shows the general decrease in foam density corresponding to increasing both levels of promoter and catalyst.

TABLE II

| Number | Advacat 30[1], weight added to the Control Formula, grams | Lupersol DDM weight added to the Control Formula, grams | Gel time, minutes | Foam Density, pcf |
|---|---|---|---|---|
| 1 | — | 0.5 | 25 | 70.1 |
| 2 | 0.10 | 0.5 | 2.0 | 66.2 |
| 3 | 0.20 | 0.5 | 2.6 | 61.2 |
| 4 | 0.50 | 0.5 | 3.9 | 58.4 |
| 5 | 1.00 | 0.5 | 4.5 | 54.0 |
| 6 | — | 1.25 | 18 | 69.2 |
| 7 | 0.10 | 1.25 | 2.1 | 66.2 |
| 8 | 0.20 | 1.25 | 2.2 | 62.1 |
| 9 | 0.50 | 1.25 | 2.3 | 50.4 |
| 10 | 1.00 | 1.25 | 2.1 | 44.7 |
| 11 | — | 2.50 | 15 | 70.5 |
| 12 | 0.10 | 2.50 | 2.9 | 60.0 |
| 13 | 0.20 | 2.50 | 2.2 | 56.6 |
| 14 | 0.25 | 2.50 | 2.6 | 46.9 |
| 15 | 0.50 | 2.50 | 2.1 | 43.0 |
| 16 | 1.00 | 2.50 | 1.9 | 29.1 |
| 17 | 1.50 | 2.50 | 1.8 | 25.8 |

[1]Advacat 30 is a trademark of Cincinnati Milicron Chemical, Inc. for a liquid 6% cobalt salt polyester promoter.

EXAMPLE 3

The procedure of Example 1 was repeated using another cobalt promoter. Table III shows the general decrease in foam density corresponding to increasing levels of promoter and catalyst.

TABLE III

| Number | Advacat 97[1], weight added to the Control Formula, grams | Lupersol DDM weight added to the Control Formula, grams | Gel time, minutes | Foam Density, pcf |
|---|---|---|---|---|
| 1 | — | 0.5 | 25 | 70.1 |
| 2 | 0.10 | 0.5 | 1.2 | 65.8 |
| 3 | 0.20 | 0.5 | 2.1 | 57.8 |
| 4 | 0.50 | 0.5 | 2.8 | 53.4 |
| 5 | 1.00 | 0.5 | 2.8 | 50.1 |
| 6 | — | 1.25 | 18 | 69.2 |
| 7 | 0.10 | 1.25 | 1.3 | 66.4 |
| 8 | 0.20 | 1.25 | 2.0 | 58.7 |
| 9 | 0.50 | 1.25 | 2.0 | 49.5 |
| 10 | 1.00 | 1.25 | 2.0 | 40.8 |
| 11 | — | 2.50 | 15 | 70.5 |
| 12 | 0.10 | 2.50 | 1.5 | 58.7 |
| 13 | 0.20 | 2.50 | 1.8 | 53.4 |
| 14 | 0.25 | 2.50 | 1.2 | 48.8 |
| 15 | 0.50 | 2.50 | 1.6 | 39.5 |
| 16 | 1.00 | 2.50 | 2.0 | 26.0 |
| 17 | 1.50 | 2.50 | 2.0 | 21.7 |

[1]Advacat 97 is a trademark of Cincinnati Millicron Chemical, Inc. for a liquid 6% cobalt complex with a halide alcoholate.

EXAMPLE 4

The procedure of Example 1 was repeated using cobalt (12%) octoate promoter and a 30% aqueous hydrogen peroxide solution as catalyst. Table IV shows the decrease in foam density with increasing levels of promoter and catalyst.

TABLE IV

| Number | Cobalt (12%) octoate weight added to the Control Formula, grams | Hydrogen peroxide, (30% in water) weight added to the Control Formula, grams | Gel time, minutes | Foam density, pcf |
|---|---|---|---|---|
| 1 | — | 0.5 | 19 | 67.8 |
| 2 | 0.10 | 0.5 | 8.8 | 51.1 |
| 3 | 0.20 | 0.5 | 1.5 | 38.3 |
| 4 | 0.50 | 0.5 | 0.8 | 41.9 |
| 5 | 1.00 | 0.5 | 0.3 | 42.7 |
| 6 | 1.00 | 0.75 | 0.3 | 30.8 |
| 7 | 1.00 | 1.00 | 0.4 | 24.2 |
| 8 | 1.00 | 1.25 | 0.4 | 22.8 |
| 9 | 1.00 | 1.50 | 0.5 | 15.1 |
| 10 | 1.00 | 1.75 | 0.6 | 13.6 |
| 11 | 1.00 | 2.00 | 0.6 | 10.3 |
| 12 | 1.00 | 2.25 | 0.8 | 9.4 |
| 13 | 1.00 | 2.50 | 1.8 | 8.7 |

EXAMPLE 5

Control Formula II was prepared using Resin A and Resin B in the same proportions as in Example 1, but a 64% aqueous solution of hydrazine was used as the blowing agent.

Control Formula II

| Components | Weight, grams |
|---|---|
| Resin A | 37.5 |
| Resin B | 12.5 |
| Base Resin | 50.0 |
| 64% aqueous hydrazine | 1.0 |
| Total | 51.0 |

Method of Preparation of Promoted Resin Formulas

51.0 grams of Control Formula II were weighed into an 8 oz. paper cup. Cobalt (12%) octoate was blended into the 51.0 grams of Control Formula II at the rate described in Table V below. The temperature of each blend was brought to 77± 1°F.

Method of Preparation of Foams

Each system was prepared in the same manner as those systems of Example 1. Table V shows the general decrease in the foam density associated with increasing levels of promoter and catalyst.

TABLE V

| Number | Cobalt (12%) octoate, weight added to the Control Formula, grams | Lupersol DDM, weight added to the Control Formula, grams | Gel time, minutes | Foam Density, pcf |
|---|---|---|---|---|
| 1 | — | 0.5 | 30 | 69.4 |
| 2 | 0.10 | 0.5 | 11.5 | 60.0 |
| 3 | 0.20 | 0.5 | 7.5 | 56.6 |
| 4 | 0.50 | 0.5 | 2.5 | 50.8 |
| 5 | 1.00 | 0.5 | 0.3 | 46.3 |
| 6 | — | 1.25 | 19 | 67.6 |
| 7 | 0.10 | 1.25 | 5.5 | 54.5 |
| 8 | 0.20 | 1.25 | 3.5 | 48.9 |
| 9 | 0.50 | 1.25 | 0.9 | 44.5 |
| 10 | 1.00 | 1.25 | 0.2 | 38.4 |
| 11 | — | 2.50 | 12.8 | 68.7 |
| 12 | 0.10 | 2.50 | 4.5 | 53.3 |
| 13 | 0.20 | 2.50 | 2.2 | 50.9 |
| 14 | 0.50 | 2.50 | 0.7 | 37.7 |
| 15 | 1.00 | 2.50 | 0.1 | 33.8 |

EXAMPLE 6

Example 1 was repeated employing toluene sulfonyl hydrazide as the blowing agent in place of OBSH, and with Lupersol DDM at 2.5 grams with the following results:

TABLE VI

| Number | Cobalt (12%) octoate weight added to the Control Formula, grams | Gel time, minutes | Foam Density, pcf |
|---|---|---|---|
| 1 | — | 16.0 | 62.4 |
| 2 | 0.1 | 1.0 | 46.7 |
| 3 | 0.2 | 0.6 | 39.2 |
| 4 | 0.5 | 0.6 | 32.3 |
| 5 | 1.0 | 0.5 | 21.2 |

Compounds which merely slow polymerization; i.e., increase the gel times, have been found not to be effective in our liquid polyester resin. For example, quinone compounds increase gel times without significant improvement. P-benzoquinone and hydroquinone in amounts of 2.0 grams added to our cobalt-Lupersol formulations (10% of the quinone in triethyl phosphate) increased gel times without any significant improvement in foam density.

If a typical cobalt promoter level is defined as 0.10 grams per 100 grams of base resin, and a typical catalyst level is defined as 1.0 grams per 100 grams of base resin as illustrated by the examples, a significant reduction in foam density is obtained when both the cobalt promoter and peroxide catalyst levels are increased far above their typical levels. For example, foam densities below 50 pcf are obtained when both the cobalt promoter level and the Lupersol DDM level are at 5 times their typical levels (see example 14, Table I, example 14, Table II and example 14, Table III). A further reduction in density to less than 30 pcf is achieved when the cobalt promoter level is increased to about 20 times its typical level (see example 17, Table I, example 16, Table II and example 16, Table III).

We have found that hydrogen peroxide (30% in aqueous solution) catalyzes foam polyester systems promoted with cobalt. This is a catalyst not typically used in polyester resins, but it is used in special formulations for high reactivity. Hydrogen peroxide is more effective in reducing density on an equal weight basis than methylethylketone peroxide. An increasing amount of hydrogen peroxide at constant promoter levels reduces foam density, but it slows polymerization. A minimum threshold level of promoter is required for a particular level of hydrogen peroxide and this threshold level must increase as the hydrogen peroxide level increases in order to achieve curing. For example, the cobalt (12%) octoate threshold level is 1.00 grams. A 50 pcf foam is obtained using a much lower cobalt level than with Lupersol DDM catalyst.

What we claim is:

1. An expandable liquid unsaturated polyester resin composition which comprises in combination:
   a. a liquid unsaturated polyester resin in solution with an ethylenically unsaturated monomer and subject to cross-linking by a peroxide -curing agent;
   b. a peroxide-curing agent activated at temperatures below about 100°F which provides free radicals on decomposition in an amount to effect cross-linking of the polyester resin;

c. an expanding amount of from about 0.1 to 15 phr of a blowing agent which provides a sulfonyl hydrazide moiety; and d. an activating amount of a cobalt activator to promote the cure of the polyester resin, the cobalt activator present in an amount of from about 0.5 to 5.0 phr and the peroxide-curing agent in an amount of from about 3.0 to 10.0 phr, the cobalt activator and peroxide-curing agents in combination permitting the substantial decomposition of the sulfonyl hydrazide blowing agent prior to gelation of the polyester resin.

2. The composition of claim 1 wherein the polyester resin is the condensation product of adipic acid, dipropylene glycol and maleic anhydride, and the unsaturated monomer is selected from the group of styrene and vinyl toluene.

3. The composition of claim 1 wherein the peroxide-curing agent is selected from the group of methylethyl ketone peroxide and aqueous hydrogen peroxide.

4. The composition of claim 1 wherein the blowing agent is selected from the group of oxybis(benzenesulfonyl hydrazide) and toluene sulfonyl hydrazide.

5. The composition of claim 1 wherein the activator is an oil-soluble cobalt soap.

6. The composition of claim 5 wherein the cobalt is selected from the group of cobalt octoate, cobalt naphthenate, cobalt acetylacetonate, cobalt 2-ethyl hexoate, cobalt oleate, cobalt linoleate, cobalt stearate, cobalt tallate and cobalt neodeconoate.

7. The composition of claim 1 wherein the composition contains as a filler hollow glass microbeads.

8. The composition of claim 1 wherein the cobalt is present in an amount of to 1.0 to 2.5 phr, and the peroxide is present in an amount of 4.0 to 6.0 phr.

9. A method of preparing low-density polyester foams, which method comprises:

a. mixing a liquid polyester resin composition which comprises
  i. a liquid unsaturated polyester resin in solution with an ethylenically unsaturated monomer and subject to cross-linking by a peroxide-curing agent,
  ii. a peroxide-curing agent activated at temperatures below about 100°F in the polyester resin, and which provides free radicals on decomposition in an amount to effect cross-linking of the polyester resin,
  iii. a blowing amount of from about 0.1 to 15 phr of a blowing agent which provides a sulfonyl hydrazide moiety, and
  iv. an activating amount of a cobalt activator to promote the cure of the polyester resin, the peroxide-curing agent present in an amount of from about 3.0 to 10.0 phr, and the cobalt-activator in an amount of from about 0.5 to 5.0 phr; and b. expanding the mixed polyester resin by the substantial decomposition of the sulfonyl hydrazide moiety prior to gelation of the polyester resin.

10. The method of claim 9 which includes aerating the polyester resin by high-shear mixing prior to expanding and curing.

11. The method of claim 9 which includes injecting the mixed polyester resin into a mold prior to expanding and curing to provide a molded structural foam product.

12. The method of claim 9 wherein the liquid polyester resin is maintained at a temperature of from 65° to 85°F.

13. The method of claim 9 wherein the peroxide agent is selected from the group of methylethyl ketone peroxide and aqueous hydrogen peroxide.

14. The composition of claim 1 wherein:

a. the peroxide-curing agent is selected from the group of methylethyloketone peroxide and aqueous hydrogen peroxide;

b. the cobalt activator is an oil-soluble $C_6$–$C_{18}$ cobalt salt;

c. the blowing agent is selected from the group consisting of oxybis(benzenesulfonyl hydrazide) and toluene sulfonyl hydrazide; and d. the ethylenically unsaturated monomer is selected from the group consisting of styrene and vinyl toluene.

15. The composition of claim 1 wherein the peroxide-curing agent decomposes to provide an alkoxy-free radical.

16. The method of claim 9 wherein the polyester resin is the condensation product of adipic acid, dipropylene glycol and maleic anhydride, and the unsaturated monomer is selected from the group of styrene and vinyl toluene.

17. The method of claim 9 wherein the blowing agent is selected from the group of oxybis(benzenesulfonyl hydrazide) and toluene sulfonyl hydrazide.

18. The method of claim 9 wherein the activator is an oil-soluble cobalt soap.

19. The method of claim 18 wherein the cobalt is selected from the group of cobalt octoate, cobalt naphthenate, cobalt acetylacetonate, cobalt 2-ethyl hexoate, cobalt oleate, cobalt linoleate, cobalt stearate, cobalt tallate and cobalt neodeconoate.

20. The method of claim 9 wherein the composition contains as a filler hollow glass microbeads.

21. The method of claim 9 wherein the cobalt is present in an amount of to 1.0 to 2.5 phr, and the peroxide is present in an amount of 4.0 to 6.0 phr.

22. The method of claim 9 wherein the expansion and gelation of the polyester resin are solely by the heat of the reaction exotherm.

* * * * *